July 29, 1969   R. K. GREBE ET AL   3,458,787
ELECTRICAL CONTROL SYSTEM
Filed Jan. 5, 1966   3 Sheets-Sheet 1

INVENTOR.
ROBERT KARL GREBE
EARL RAYMOND KREINBERG
BY Curtis, Morris + Safford

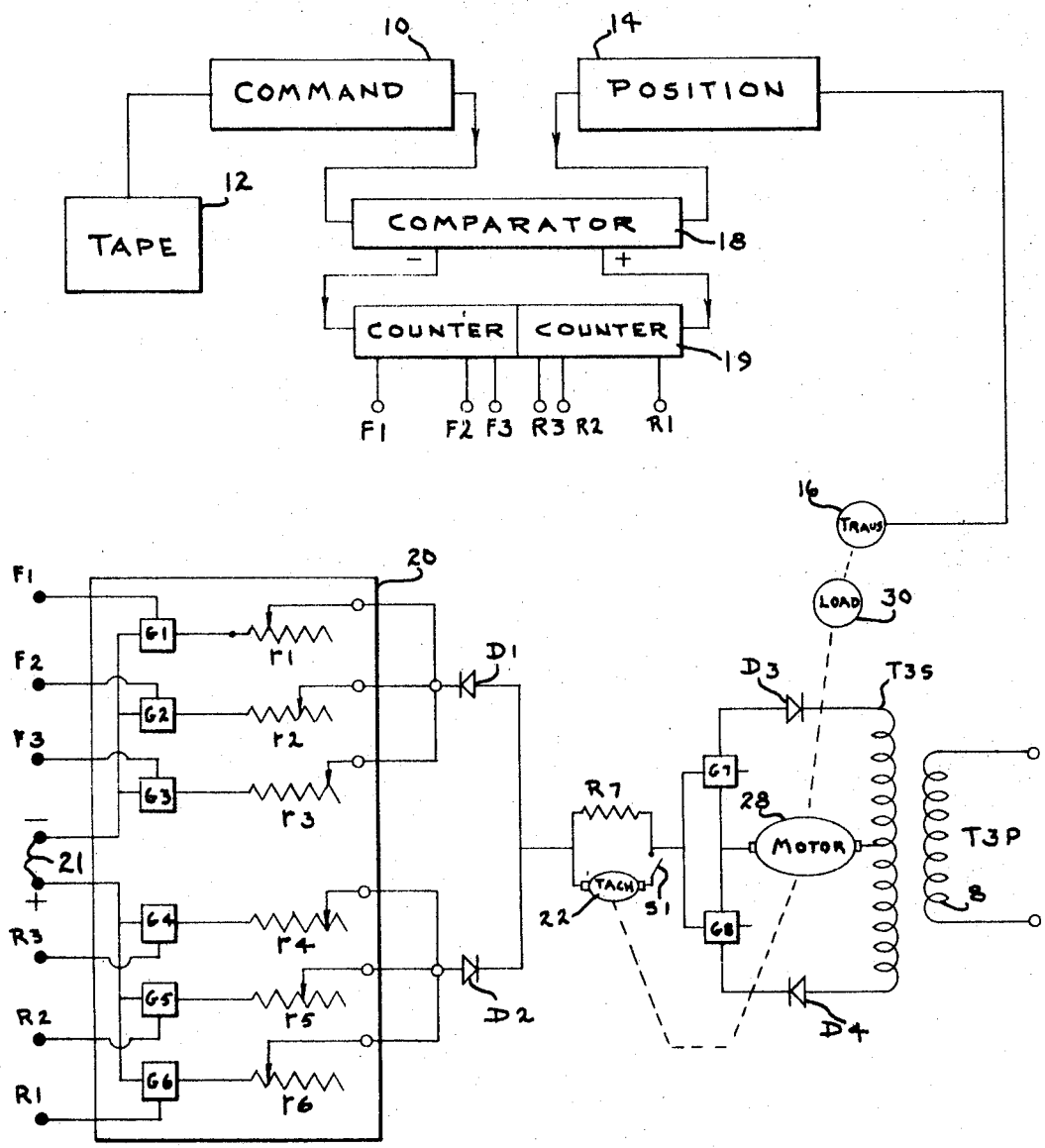

United States Patent Office 3,458,787
Patented July 29, 1969

3,458,787
ELECTRICAL CONTROL SYSTEM
Robert Karl Grebe and Earl Raymond Kreinberg, Harrisburg, Pa., assignors to AMP Incorporated, Harrisburg, Pa.
Filed Jan. 5, 1966, Ser. No. 532,014
Int. Cl. H02p 1/54, 5/46, 7/74
U.S. Cl. 318—18                20 Claims

ABSTRACT OF THE DISCLOSURE

A control system is presented which features a numerical control circuit operable to provide a numerical count output representative of distance-to-go of a driven part for a cycle of movement. Numerical count is utilized to modify power supplied to a motor driving such part to modify a servocircuit for such motor, including a tachometer. Motor control is developed through a control signal which determines forward or reverse drive based upon polarity and determines rate-of-travel based upon quantity. Numerical count representing distance-to-go is translated into distinct voltage levels forming a composite signal with the tachometer voltage to provide an optimized acceleration and deceleration of the part throughout a cycle of movement. A tachometer cut-out switch provides maximum acceleration by making each cycle start independent of numerical count to thus apply maximum power to the motor. At a preselected point based on numerical count the tachometer is cut back in to restore control by the numerical count as translated into distinct voltage levels. Conversion of the numerical count into an analog representation is achieved through the use of distinct sets of voltage inputs each related to a given count and to positive and negative polarities, related to forward and reverse directions. These voltage levels are connected to an operational amplifier having a single output and unity gain so as to be polarity-responsive and effect an algebraic representation of input. A method is taught for adjusting the control system by relatively adjusting voltage levels and distinct, high medium and low speeds so as to achieve a smooth and relatively constant deceleration from a maximum speed to the end of part travel without overshoot.

Background of the invention

In general, the task of controlling relative movement between two parts includes factors of distance-to-go, rate-of-travel over such distance, direction of movement and choice of particular path. The present application is related only to the factors of distance-to-go and rate-of-travel.

Two basic techniques have evolved for control of distance-to-go and rate-of-travel factors. The simplest is an analog approach wherein the distance-to-go is represented as some signal amplitude reference to zero distance-to-go. For greater accuracy, distance-to-go is represented by some numerical count referenced to either zero or some other numerical quantity. Both techniques are also used for controlling rate-of-travel and a combination of the techniques can be found for controlling distance-to-go and rate-of-travel.

In U.S. Patent No. 3,110,865 to Scuitto, for example, there is described a feed rate control system which utilizes control pulses related in number to distance-to-go and related in rate to the rate-of-travel over such distance. The system control is continuous over the entire distance traveled and is particularly designed to prevent over-shoot. A pulse oscillator is controlled in frequency to first bring the driven part up to speed and then to gradually reduce its speed or rate-of-travel as the driven part moves toward the terminal point of desired travel.

Another example of the prior art is taught by U.S. Patent No. 3,190,139 to Swanson et al., which is drawn to a programmed motion control system. The Swanson system utilizes a tape record to develop drive for an electric motor and load through a mechanical transmission shifted by the indicia on the tape into different rates of travel. The various distance-to-go and various rate-of-travel factors are thus predetermined by a tape record. Control is executed via a mechanical shifting of various clutches and transmission ratios. Still another example of prior art efforts include the patent to J. W. Forrester et al., No. 3,069, 608. The Forrester system uses a digital control to determine distance-to-go and utilizes pulse rate control for determining rate-of-travel. The rate-of-travel of the machine or "feed rate" is selectively changed by means of a plurality of clock cycle sources of different rates which may be selected by instructions punched into a tape supplying machine intelligence. For a given selection of pulse rate the "feed rate" of the machine is constant.

In these examples of specific prior art efforts and in the prior art in general there is a tendency toward complexity either in the control circuit or in the mechanism for carrying out control. Thus, in one example the control circuit must constantly monitor distance-to-go and cause an adjustment in rate-of-travel which is progressively reduced as the distance-to-go reduced toward zero. On the other hand, a further example utilizes a control system which, in order to change rate-of-travel, must operate a plurality of clutches sequentially to obtain different mechanical transmission ratios. In most of the prior art no particular emphasis is given to developing a control cycle which is both automatic in the sense of being utilized identically in each cycle and also maximized in terms of rate-of-travel for each different distance traveled.

Summary of the invention

This invention relates to an electrical control system of the type employed to automatically control movement of one part or device relative to another part or device. The invention is particularly adapted to uses with machines for making electrical connections, although numerous other uses are contemplated, which will be suggested to those having skills in the control arts.

It is a general object of this invention to eliminate circuit and mechanism complexities and to provide an automatic and repetitive control of distance-to-go and rate-of-travel factors with maximum machine speed. It is another object of the invention to provide a control which achieves a rate of machine speed approaching that of the maximum potential of the particular motor utilized for drive without over-shoot and without the provision of a separate braking system or mechanical transmission. It is still another object of the invention to provide an electrical control system capable of driving parts in movement of relative closure at high rates of speed and with great accuracy.

It is yet a further object of the invention to provide a control system wherein the distance-to-go factor is measured numerically, but implemented through a simple voltage level circuit without the need for measurement for rate-of-travel. It is still a further object of the invention to provide a novel control circuit for use with digital command and position means wherein machine drive is supplied directly from a power supply and not through the elements of the control circuit.

The control circuit of the invention operates in conjunction with a command-position circuit which numerically establishes a given distance-to-go and provides a numerical count of the actual position of the driven part. The distance-to-go intelligence is translated into one of three control voltages representative of high, medium and low speeds of machine operation. This translation is superimposed on a tachometer generated voltage, which is part of a servocircuit utilized to regulate motor speed in the different rates-of-travel. The three control voltage levels are quantitatively related to the tachometer voltage to provide appropriate forward or reverse drive to the motor without additional programming.

The combined control and tachometer voltage is employed to control both on-time of gates which supply power to the motor of the system and to control the selection of such gates to determine the sense of power applied; forward or reverse. In accordance with the circuit of the invention the instantaneous quantity of this composite voltage is used to establish rate-of-travel and the instantaneous polarity is used to establish sense of power applied.

The control technique possible with various embodiments of the circuit system forms a method of control as a further aspect of the invention.

In the drawings:

FIGURE 3 is a block diagram representing the circuit of the invention;

Description of preferred embodiment of the invention

In the description of the invention hereinafter to follow reference will be made to the terms distance-to-go and rate-of-travel and to the term load. It is contemplated that the term distance-to-go may be related to movement along an axis between fixed and movable parts such as between the head and table of a machine tool or it may be related to rotary movement such as that of a wire feed wheel. Rate-of-travel is in either instance treated in the same manner as speed of the driven and moving part which is the load of the system.

The need for both types of movement is generally disclosed in U.S. Patent 3,186,077 to G. R. Vickery, Jr. relating to Apparatus for Wiring Panel Boards. In such patent there is a terminal applicator head which is driven in X and Y directions relative to a fixed table upon which is mounted a panelboard having an array of terminal posts to be interconnected in a desired manner. There is also a wire feed which is required to supply lengths of wire related to the movement of the applicator head from point-to-point. The drive of the applicator head relative to table and panelboard must be controlled in each axis rather exactly over the distance-to-go from a start point to a stop point. To achieve maximum speed without overshoot the rate-of-travel of such head must also be controlled rather exactly. The occurrence of applicator head over-shoot in such application is troublesome both from the point of increasing the time of application per terminal and for the reason that in most instances wire is being laid as the applicator head is caused to move. Since the whole purpose of the machine is to reduce the cost of making connections by providing high speed, error free point-to-point termination, the control of rate-of-travel is of transcending importance.

In the Vickery patent the applicator head is caused to move forward and backward along axes in X and Y directions. The wire feed in the Vickery patent calls for movement only in one direction along a single axis. In the embodiment chosen to represent the present invention the disclosure will be related to movement in one axis and in two directions, forward and reverse; it being contemplated that movement can be controlled in additional axes by the duplication of parts of the system disclosed. It is also contemplated that for the typical wire feed application only that part of the system of the invention necessary for control in one direction need be employed. An expansion of the system of the invention or a modification thereof by duplication or elimination of parts and related function will be apparent to those skilled in the control arts.

Figure 1:
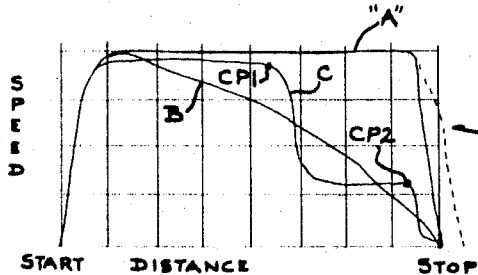
FIGURES 1 and 2 represent plots of speed-distance characteristic curves of various modes of operation included to explain the invention.

With the foregoing in mind, reference is made to FIGURE 1, which is a speed-distance plot of possible operating characteristics for a motor driven load in one direction along a single axis for one cycle of movement. The abscissa, distance, can also be considered as time since the two dimensions are practically related (assuming zero slippage). The curve shown as A represents an optimum characteristic which is practical with known drive devices. The rise and fall portions of this characteristic deviate from what otherwise would be a square-wave representing infinite acceleration and deceleration by amounts intended to depict what is possible with existing motors and some load which is relatively small when compared to the motor torque characteristic. The upper flat portion of the curve may be taken to represent a motor-load speed near the maximum speed available with a given motor and with a given load.

The rise characteristic of curve A is relatively easily accomplished, it being only necessary to apply full power to the motor on initiation of the movement cycle. The deceleration portion of curve A is what is difficult. This problem is caused by the fact that if deceleration is not initiated soon enough, motor and load inertia will carry the driven part to a point of over-shoot, as indicated by the dotted line part of curve A. Initiation of deceleration prematurely will result in under-shoot. In both instances an additional control sequence will be required. This means that additional control apparatus will be necessary and that additional time in application per movement cycle will be required. In certain applications, as in milling, drilling or machining, over-shoot will result in scrapping of the part. In other applications, as in the previously mentioned patent to Vickery, constant over-shoot may produce a twenty or thirty percent reduction in operating speed as well as complicate wire feed and wire placement procedures of the system.

The characteristic curve A is as stated, only theoretical. The only presently known way to achieve the characteristic of curve A is to utilize a separate and additional braking mechanism initiated by some external control means.

The characteristic of curve B is typical of existing systems which measure and change the rate-of-travel continuously as distance-to-go is reduced toward zero. As can be discerned from FIGURE 1, systems having such characteristic are considerably slower in operation than are systems having a characteristic approaching that of curve A. A system operating with the characteristic of curve B is only sixty percent as fast as that of a system operating with the characteristic of curve A.

The characteristic curve labeled C is representative of a control system which is little better than that having the characteristic of curve B, in that the average speed over a given distance is about the same. A system having a characteristic like that of curve C can be visualized as having a series of discrete deceleration points located some distance from the stop point. Thus, at a first control point c.p.–1 the system is decelerated from high speed to some constant medium speed, which it maintains for a further distance to be decelerated to a low speed again at a second control point c.p.–2. At the stop point the system is decelerated to a zero speed. With systems wherein the stop point is defined by a dead-band (no power applied to the motor) the low speed must be controlled so as not to permit over-shoot.

With the system of the invention a control characteristic like that of curve C may be readily obtained through a circuit and mechanism which is simple and reliable. More importantly, through the invention system this characteristic may be materially improved upon to yield a characteristic like that of curve D in FIGURE 2, which approximates very closely the theoretically optimum characteristics for a given motor and load. One aspect of the invention relates to a control system which is capable of being tuned to yield a characteristic like that of curve D. Another aspect of the invention is the system itself, its inherent simplicity and ease of manipulation and the construction of the translator drive portion of the system circuit. Yet another aspect is the method by which improved operation can be obtained.

General operation

Referring now to FIGURE 3 the upper portion represents means which receives and implements control data. There is provided a command register 10 adapted to be driven by signals produced in accordance with predetermined indicia as from a tape reader 12 to some desired numerical count representative of the position to which a driven part is to be moved. A position register 14 is provided which is adapted to be driven by signals representing a numerical count produced by a transducer to the driven part to represent the actual position of such part as a given instant. A comparator 18 is provided to develop the difference between counts in 10 and 12. A counter 19 connected to 18 is utilized to track the count difference registered in 18 and also the sense of difference. These components are standard in the control arts and are usually arranged to handle the count quantities on a binary counting basis, although digital, decimal and other codes are also employed and are contemplated for use with the invention system.

To summarize the operation of this portion of the control system an outline of a control sequence will now be given with respect to a driven part which must be driven in two directions; in forward and reverse cycles of movement. The first step is to define the total travel of the driven part in terms of a numerical quantity representative of distance. Assuming that the total possible travel of a driven part is 40 inches a numerical count of 40,000 is employed with each increment representing one thousandth of an inch. The transducer 16, which may be an electro-optical pulse generator mechanically tied to the driven part is arranged so that if the driven part is at one extreme of its travel, either at the 0 position or the 40,000 position, movement of the driven part will produce an input to the position register 14. This input will either increase the count from 0 or decrease the count from 40,000 depending on initial position to exactly represent the position of the driven part.

The comparator 18 is set up so as to provide an output indicative of both the quantity of difference between the quantities registered in 10 and 14 and the sense of such difference. Electrically, this is handled by having the comparator provide a positive signal output if the command count is larger than the position count and a negative signal if the position count is larger than the command count. In this way counter 19 is driven to count downwardly each cycle toward a zero difference representing an executed movement to the command position. To explain this, assume that the driven part is located in the center of its total travel or at the numerical position of 20,000. The position register 14 registers this quantity. Assume that the first cycle of movement calls for a movement in one direction (forward) of 500 thousandths of an inch. The command register is then driven by 12 to a count of 20,500. The comparator then produces a difference count of 500 in the positive sense energizing the positive output lead to set the right-handed portion of counter 19 to a count of 500. At this time a start cycle signal initiates movement of the driven part to drive the register 14 to a count of 20,500, which will cause the difference to be reduced to zero and cause counter 19 to count down from 500 to zero. This will be more completely described hereinafter, but essentially the sense of direction called for develops a potential which initiates drive of the system motor in a direction which causes the transducer 16 to pulse the position register 14 adding to its count until it has reached the count registered in the command register 10, such as 20,500. As this occurs the comparator is driven by 14 to in turn drive 19 to count progressively downward toward zero.

If the next cycle calls for movement in an opposite sense (reverse) to that previously described in a movement of the driven part for 600 thousandths of an inch, the command register is set with a count of 19,900; the position register then being at 20,500, the count to which it was driven in the previous cycle. The comparator then registers a difference in a negative sense of 600, which is set in the left-hand portion of the counter. On a start signal this operates to cause the driven part to move in a sense so that the transducer produces pulses driving the count of 14 from 25,000 to 19,900. This causes the comparator and counter to count downwardly from 600 to zero.

The foregoing procedure and the elements described are standard in the control arts. There would be in addition to the elements shown, some sequencing means to initiate and terminate the various cycles by energizing and de-energizing the various elements 10, 14, 18 and 19. In general the command register is first loaded from the tape means 12 and then triggered to output to the comparator, which simultaneously provides an appropriate output of proper polarity to drive counter 19. After the counter 19 is properly set a further sequence signal then energizes the remainder of the circuit to initiate drive which proceeds until a zero difference is reached. Thereafter a signal is developed to indicate that the commanded cycle has been completed and that the circuit is ready for the next cycle and the next input to the command register.

In accordance with the invention outputs are taken from different bit positions representative of the different quantities of counts in the counter 19. These outputs are typically pulses produced, as a given stage or bit position representative of a given count is set or cleared as the counter counts down from the maximum count set therein toward zero. Leads shown as F–1, F–2, F–3 and R–1, R–2, R–3 are connected into 19 so as to be pulsed sequentially as the count is reduced. The F terminals are pulsed responsive to a difference calling for forward movement and the R terminals are pulsed for reverse movement. In the previous example for a forward movement of 500 thousandths of an inch the left-hand part of the counter 19 is set to pulse F–1 when the count is above 400, to pulse F–2 when the count reaches 400 and to pulse F–3 when the count reaches 80. A count down in the right-hand portion of 19 for reverse movement is made to produce pulses on R–1, R–2, and R–3, in a similar manner. The pulses are produced in accordance with the assignment of the leads to a given counter stage and thereby to a given distance-to-go to provide high, medium and low rates of travel. Relating this to the speed-distance characteristic curves C and D in FIGURES 1 and 2, the pulses produced on either set of leads F–1—F–3, and R–1—R–3 are associated with the speed prior to control point c.p.–1, between c.p.–1 and c.p.–2 and after c.p.–2. These control points may be readily changed in terms of distance-to-go for a given speed by changing the connection of the leads to a given stage or bit position of the counter.

The foregoing explains system operation relative to bidirectional movement. For control in one direction as in the case in wire feed applications, components 10, 14 and 18 can be eliminated and the tape reader 12 and transducer 16 connected to drive the counter directly. Assume that there is a first cycle calling for 20 inches of wire followed by a cycle calling for 10 inches of wire. The counter 19 is first programmed to 20,000 directly from 12. Then upon command the cycle is initiated to drive the system motor and transducer 16 producing pulses to reduce the count to zero. Next, the tape reader is operated to drive the counter to 10,000 and initiate the second cycle; 16 operating again to reduce the count to zero. In each case, leads such as F–1, F–2, and F–3 can be employed to develop trigger pulses associated with high, medium and low speeds of wire feed.

Figure 4:
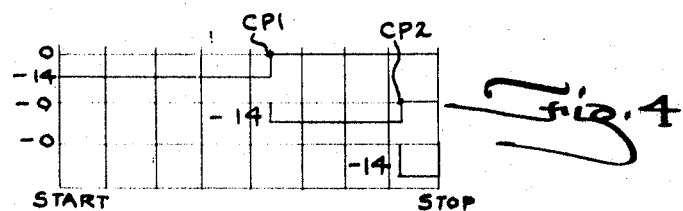
FIGURES 4–7 are plots of voltage versus distance or time at various points during one cycle of operation of the circuit of FIGURE 3.

In accordance with one embodiment of the circuit of the invention, a translator shown as 20 in FIGURE 3 is provided to respond to pulses generated on leads F–1–F–3 and R–1 and R–3 and develop voltage levels which are made to persist as long as the count is above a certain quantity. This is accomplished by providing a series of gates shown as G–1 through G–6 connected to be triggered by pulses on the forward and reverse leads F-1 through F–3 and R–1 through R–3 and with a D.C. power supply 21 of different polarity for each set of leads. The gates G–1 through G–3 associated with F–1 through F–3 are provided with a negative supply and the gates associated with R–1 through R3– are supplied with a positive supply. The gates may be any suitable solid state switch or even a high speed relay. Upon the occurrence of a pulse on a given lead the associated gate is operable to connect the associated power supply to the output associated with such gate. As an example, when the count in 19 is above 400, F–1 triggers G–1 to provide a negative voltage level to associated resistor $r$–1. When the count in 19 is reduced to a given quantity such as 400, lead F–2 is impulsed to trigger G–2 to energize the output lead associated with resistor $r$-2. As the count reaches 80, F–3 is impulsed to provide a negative voltage level to resistor $r$–3. The voltage levels so generated can be visualized from FIGURE 4, which is based upon supply 21 being a negative 14 volts.

A count in the opposite half of 19 produces a similar operation of the gates G–4 through G–6 associated with leads R–2 through R–3. While not shown it is understood that means are provided to close (cut off) a preceding gate as the count is reduced to open (cut on) a succeeding gate. Thus, as the gate associated with F–2 is energized, a pulse is produced to close the gate associated with F–1, and as the gate associated with F–3 is energized F–2 is caused to be closed.

The translator 20 thus operates to provide a negative voltage of the given level to each of the resistors $r$–1 through $r$–3 as the counter 19 is caused to count down toward a zero difference count and as the driven part moves toward the commanded position. A count and movement in the opposite direction in a similar manner causes resistors $r$–4 through $r$–6 to be provided with a positive voltage of a given level.

Figure 5:
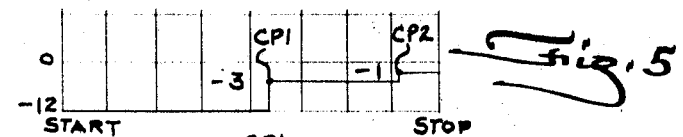

The resistors $r$–1 through $r$–6 are adjustable and by various adjustments the output leads from the translator which are commoned with respect to the forward and reverse direction elements are made to provide distinctly different voltage levels of a common polarity as the leads F-1 through F–3 or R–1 through R–3 are progressively impulsed from 19. These voltage levels may be considered as high, medium and low associated with a count which is representative of high, medium and low rates-of-travel and as heretofore mentioned, distances-to-go. FIGURE 5 shows the voltage levels for one cycle produced as outputs from $r$–1, $r$–2, $r$–3 when the supply 21 is 14 volts.

To the right of the translator 20 is a power supply and D.C. motor connected to the driven part or load. A servo-link is included by the provision of a mechanical connection with a tachometer arranged to feed its output voltage back into the motor power supply through gates which regulate the sense and quantity of power applied to the motor.

The output from 20 is connected to drive the motor in the following manner. The outputs from the commoned leads connected with resistors $r$–1, $r$–2, $r$–3, $r$–4, $r$–5 and $r$–6 are isolated from each other by a suitable means such as diodes D–1 and D–2, and are thereafter commoned as shown in FIGURE 3 to provide an input trigger through a balancing resistor $r$–7 to a pair of gates G–7 and G–8. The tachometer 22 of the servo-circuit of the system is adapted to be connected between the inputs supplied from translator 20 and the gates G–7 and G–8 through a switch shown as S–1. This switch is closed by means not shown upon pulsing of the leads F–2 or R–2. This effectively removes the tachometer voltage from the circuit during the high speed operation of the system. The gates G–7 and G–8 may be considered as any suitable switch device such as an SCR. The gate G–7 is connected to be turned on responsive to negative voltages supplied to the trigger of the gate and G–8 is adapted to be turned on by a positive trigger supplied thereto. Additionally, the gates should be selected so as to conduct in proportion to the voltage level applied to the trigger. If SCR's are used suitable means now shown should be employed to turn the gates off responsive to a change in trigger voltage polarity from that causing conduction of the particular gate.

A D.C. motor 28 is connected to be driven by half-wave excitation from a power supply having its primary winding shown as $t3p$ and a secondary shown as $t3s$. In operation, one half cycle of an A.C. voltage developed across $t3p$ will induce a voltage in $t3s$ causing a current to flow in the associated leg which has its circuit completed. Thus, if gate G–7 is conducting current will flow for a given half cycle of power applied in the upper loop, including gate G–7 and the upper portion of the motor winding secondary $t3s$. The following half cycle will be blocked by diode D–3. Relative to the same cycle if gate G–8 is conducting (gate G–7 being open) current would flow in an opposite sense relative to the lower loop including gate 78 and the lower part of $t3s$ to provide a reverse current and power to the motor 28. Diode D–4 would block the first half cycle and conduct during the following half cycle.

In the relatively simple application shown in FIGURE 3, the power applied to the motor for movement in one direction is thus due to the positive half cycle of the supply voltage and the power for an opposite direction is from the negative half cycle of such supply voltage. The amount of power delivered to the motor is determined by the degree of conduction of the gates G–7 and G–8, which in turn is dependent upon the combined voltage level supplied to the trigger electrodes of such gates from 20 and 22.

Since the voltage output from 22 is cut out during high speed operation the voltage level applied to trigger gates G–7 and G–8 is in polarity and in quantity determined by the voltage developed from the translator 20 in high speed operation and by the algebraic sum of the voltages developed by 20 and 22 in medium and low speeds. This has been found to be quite advantageous in developing a maximum but controlled high speed operation while maintaining sensitivity in low speed operation.

Figure 6:
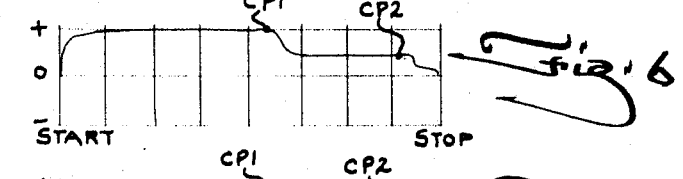
Figure 7:

FIGURE 5 represents the voltage output of the translator 20 throughout a cycle having a speed distance characteristic similar to that of curve C in FIGURE 1. FIGURE 6 represents both the voltage level at the output of 22. That part of the voltage-power curve of FIGURE 6 shown as existing up until the first event or up to control point c.p.–1 is due to the fact that the tachometer voltage is cut out during high speed opeartion.

The operation of the circuit of FIGURE 3 will now be outlined relative to the forward control cycle previously described. In this regard assume that the supply from 21 is 14 volts of the polarity indicated in FIGURE 3 and that the resistors $r$–1, $r$–2 and $r$–3 are set to produce drops of 2, 11 and 13 volts, respectively. Considering that the first cycle of operation calls for a forward movement of 500 thousandths of an inch, initiation of movement causing the left portion of the counter 19 to begin to count down energizes lead F–1 causing a negative voltage of 14 volts to be applied to resistor r–1 and 12 volts to diode D–1, resistor R–7 and to gates G–7 and G–8. Since this voltage is negative, gate G–8 will conduct and gate G–8 will remain off to cause current to drive the motor in the forward direction. As the motor is driven in the forward direction the transducer 16 operates to reduce the count registered in the position register and thereby the difference registered in the comparator and the count carried in the left portion of 19. When some distance control point (c.p.–1) is reached, such as by a count representing 400 thousandths of an inch, the negative 14 volts is gated off from the lead associated with F–1 and G–2 is closed to produce a negative 14 volts to r–2 and a negative 3 volts to G–7. At this instant the tachometer voltage will be applied to the circuit by closure of switch S–1. Since the motor is at that time operating at full speed the tachometer voltage is considerably greater than that of the negative 3 volts applied from resistor r–2 and is, of course, positive. The polarity of the voltage applied to the gates G–7 and G–8 will instantly reverse, opening G–7 and closing G–8 to apply reverse power to the motor 28. The motor and load then immediately decelerate thus dropping the tachometer voltage to a point of stabilization with an output adjusted to be slightly less than the 3 volts supplied from r–2. As this occurs the polarity of the signal applied to G–7 and G–8 will reverse to gate G–8 off and G–7 on to apply power to drive the motor in a forward sense at medium speed. As the transducer continues to alter the count in counter 19 the second control point (c.p.–2) will be reached and the voltage applied via lead r–2 removed and r–3 energized to apply a negative 1 volt level to the gates. At this point the tachometer voltage will again, by choice, be larger than the voltage supplied from r–3 to cause an instant reversal of polarity of voltage applied to G–7 and G–8 with the result that G–7 will open and G–8 will conduct. Power is then applied in a reverse sense to 28 to further brake the motor and load until the tachometer output is less than 1 volt causing a further reversal and drive forward in low speed. Finally, as the count becomes a zero and the driver part enters into the dead-band position equivalent to the stop position in the curve characteristic shown, the voltage from 20 is cut off. Since the tachometer voltage is still present there is again an instantaneous reversal of polarity to open G–7 and close G–8 applying a further but small burst of power to stop the driven part completely. This last level can be adjusted so that the driven part is made to stay within the defined dead-band zone.

A reverse movement cycle would operate in a similar fashion. For wire feed the cycle control would be identical to the forward cycle.

The preceding operation of the circuit has been described relative to a characteristic speed-distance curve like that of C. With the circuit of the invention an improved speed distance characteristic of operation can be achieved by the simple adjustment of the resistors r–1, r–2 and r–3. First, the resistance of r–1 is adjusted to raise the level of voltage applied from 20, associated with lead F–1 and high speed operation such that the motor and load are driven at a slightly higher rate of speed. This increases inertia at c.p.–1 and stretches out the deceleration curve in the manner shown in FIGURE 2, following the control point c.p.–1. Next, the resistor r–2 is adjusted to increase the voltage level applied during medium speed to a point calling for a speed at c.p.–2 close to the actual speed of the motor and load under deceleration from c.p.–1. Expressed otherwise, the control voltage for high speed is made so as to provide a deceleration characteristic extending toward the distance-to-go at c.p.–2 and the voltage level of medium speed is boosted so as to reduce the effective difference between the tachometer voltage and the voltage level set on r–2.

In this regard, the voltage level defining medium speed must not be so great that over-shoot will occur. There is a maximum low speed which, if exceeded, will cause the motor-load inertia to carry the driven part through and out of the dead-band zone. Tuning of the system by adjustment of r–1, r–2 and r–3 to yield a characteristic like curve D in FIGURE 2 can best be accomplished with the aid of an oscilloscope having persistence connected to the separate output of the tachometer which is directly representative of motor-load speed. In practice the system can be tuned quite easily by observing the speed of voltage trace of one cycle and adjusting the voltage levels at high, medium and low speeds to provide the desired characteristic. It is preferred to make the adjustments so that a slight positive drive occurs at each control point so that in the event of temporary supply voltage changes or environmental changes the system will not drift into over-shoot operation.

Detailed operation

Figure 8:
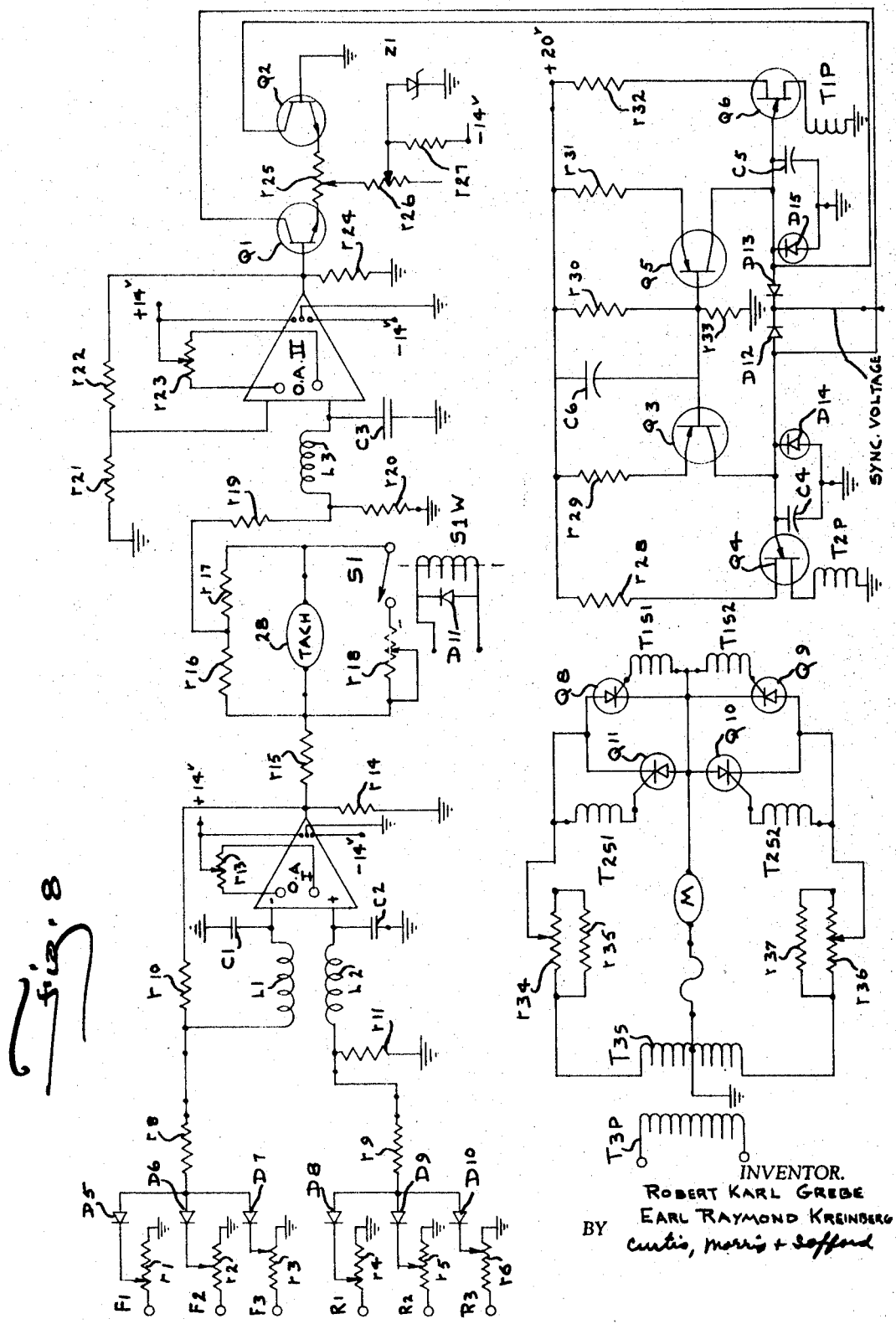
FIGURE 8 is a schematic diagram representing a detailed embodiment of the translator and drive portion of the circuit of the invention.

Referring now to FIGURE 8, there is shown a different and more specific embodiment of the control system of the invention. In the circuit of FIGURE 8 there is an identity of certain portions of the system described relative to FIGURE 3 and there is, of course, an overall identity of function with respect to circuit operation. The translator 20 of FIGURE 3 can be identified in a modified form in FIGURE 8, in the left-hand portion thereof, which includes a duplication of the leads F–1 through F–3 and R–1 through R–3 and a dulication of the variable resistors r–1 through r–6. The gates G–1 through G–6 may be assumed to be present elsewhere in the circuit, as for example associated directly with the counter of the system. As one other difference relative to the translator 20, each of the input leads F–1 through F–3 and R–1 through R–3 is of the same polarity. That is, upon closure of a path through any one of the leads, current flows in the same sense relative to current flow in the other leads to ground through the associated gate member. Current is supplied from a common negative source of a fixed voltage level such as 14 volts, connected to the first operational amplifier of the circuit. The diodes D–5 through D–10 are individually connected to the circuit paths associated with resistors r–1 through r–6 and are in a sense to provide isolation between such paths. The three forward leads F–1, F–2 and F–3 are commoned to provide an output control voltage level varying in amplitude in accordance with the selection of one of the leads. The three reverse leads associated with R–1, R–2 and R–3 are also commoned with a further lead to provide a control voltage level varying in accordance with the selection of the lead. At the common points of the forward leads and the common point of the reverse leads, the voltage levels, in accordance with the circuit of the invention are developed in the same manner as was described relative to the circuit of FIGURE 3, with the exception that both forward and reverse signals are of the same polarity.

In the embodiment of FIGURE 3 the voltage levels were fed directly to the tachometer circuit to form a composite signal utilized to select one of two gates (in accordance with polarity) and to regulate the conduction of such gates in accordance with the voltage level. In the circuit of FIGURE 8, the output levels to the tachometer are developed by selectively closing paths of different impedance in the translator relative to an operational amplifier shown as O.A.I. As will be discerned from the attached schedule, the quantities of the separate input resistors r–8 and r–0 relative to the feed-back resistor r–10 are such that the O.A.I has unity gain. The unit O.A.I. does not therefore provide amplification, but is rather used as a subtractor. The resistor r–11 is provided to stablize O.A.I. against drift and there is provided with respect to each input thereto a noise and hum filter; inductor L–1 and capacitor C–1 serving the forward lead input and inductor L–2 and capacitor C–2 serving the reverse lead input.

A positive supply such as +14 volts is supplied to O.A.I. through an adjustable reistor r–13 which permits bias adjustment. A negative supply such as −14 volts is provided to O.A.I. to develop the voltage levels output therefrom. A general description of operational amplifier theory may be found in the publication "Pulse and Digital Circuits," Millmand and Taub, McGraw Hill, 1956, pages 25 and 26. The actual elements of O.A.I. may be considered as transistors.

As the various paths associated with F–1, F–2 or F–3 are closed, assuming the voltage supplied to O.A.I. to be the positive and negative 14 volts shown, distinct negative voltage levels of 12 volts, 3 volts and 1 volt are produced, representing the difference from the 14 volt level and the drops across the resstors r–1, r–2 or r–3. If one of the paths associated with leads R–1, R–2 or R–3 is closed one of the positive voltage levels 12 volts, 3 volts or 1 volt is provided, again representing the difference between the 14 volt supply level and the setting of resistors r–4, r–5 or r–6.

The resistor r–14 and the resistor r–15 serve as a voltage divider and load.

Next, there is provided the circuit of tachometer 28, which is adapted to produce a positive voltage level related to the speed of the motor and the load. The tachometer circuit includes a voltage divider circuit comprised of identical resistors r–16 and r–17, providing an output to a further operational amplifier O.A.II. The tachometer, as heretofore described, is effectively cut out during high speed operation by a switch S–1, including contacts as shown, closed by the energization of switch winding S–1W by current through the switch input terminals from the counter stage associated with the control point c.p.–1. In this embodiment, S1 is closed to reduce the effect of 28. A diode is provided across the windings of the switch to prevent inductive kick. An adjustable resistor r–18 is provided in the switch circuit to set the tachometer voltage relative to the voltage levels produced from O.A.I. This resistor has a resistance which is low relative to the internal impedance of 28. The output from the tachometer represents then the composite voltage heretofore discussed. Resistors r–19 and r–20 are provided as a voltage divider to drop the voltage level so that a high impedance operational amplifier may be employed for O.A.II and this resistance is accordingly made high relative to the resistance of the preceding circuit.

As indicated, O.A.II is made to be a high impedance device. It is also made to have a gain of approximately 4 or 5 to 1 so as to be relatively sensitive over the reduced range of voltage involved. The resistor r–21 is accordingly made to be about a fourth or fifth of the feed-back resistor r–22. Resistor r–23 is utilized to adjust the bias applied to O.A.II. The operational amplifier O.A.II is standard and may be a solid state or tube device providing stable operation with moderate gain. By dropping the operating voltage level from that output from the tachometer and translator to that utilized with O.A.II the circuit is made quite sensitive at low speeds. At high speeds the tachometer voltage is effectively removed and there is no particular requirement for sensitivity; the motor being driven at a rate approaching full speed.

The output from O.A.II is then of a voltage level reduced from that of the composite signal produced from the tachometer and translator, but identical to, in both relative level and relative polarity. This output then is one of three levels, positive or negative, in accordance with the system command and selection of leads F–1 through F–3 and R–1 through R–3. A resistor r–24 is provided to serve as a fixed load. In an operating circuit the range of O.A.II was from 1 volt to 10 volts.

The output from O.A.II is fed to a differential amplifier through a connection to the base of an npn transistor Q–1. The differential amplifier is standard to include a second npn transistor Q–2, having its base grounded and having its emitter electrode tied to the emitter of Q–1 through an adjustable resistance r–25. The collectors of Q–1 and Q–2 are tied to leads individually connected into a switching circuit having separate outputs through transformers t1p and t2p arranged to develop trigger pulses to the motor power supply. The emitter circuit commoned with r–25 is further connected to a variable resistor r–26 and through a resistor r–27 to a negative 14 volt supply. A zener diode Z–1 is provided to hold the voltage level constant. The resistor r–25 provides means to balance the operating characteristics of Q–1 and Q–2 and r–26 provides means to adjust the operating voltage level of the circuits associated with both Q–1 and Q–2.

The differential amplifier works as follows: assuming forward operation in high speed, lead F–1 is energized to produce a relatively high voltage level (−12 volts) output from O.A.I. The tachometer voltage is cut out by reason of switch S–1 being open and a relatively high voltage level of negative polarity will be produced from O.A.II (reduced in quantity to 1.2 volts). This voltage is applied to the base of Q–1 to cause such to conduct, drawing a relatively substantial current through the lead connected to the collector thereof. This results in substantial power being applied to the motor.

As the system switches into medium speed passing control point c.p.–1, lead F–2 is then energized to produce a substantially reduced voltage level (−3 volts at the output from O.A.I) and the tachometer is cut in to provide a net positive voltage of approximately 20 volts reduced by O.A.II to a positive +10 volts. This causes Q–1 to draw a minimum current and causes Q–2 to draw a relatively high current through the lead associated with its collector electrode. The applied power to the motor is then reversed to effect deceleration. As reacceleration of the system is called for in the manner heretofore described, the voltage input to Q–1 again becomes negative, but at a reduced level to cause Q–1 to conduct, drawing a current of reduced level through the lead associated with its collector electrode. The transistor Q–2 will instantly cut back. A similar operation will occur as the system moves from medium speed to low speed and finally when the voltage is removed from lead F–3 as heretofore described Q–1 is cut off and Q–2 is caused to conduct briefly to provide a signal bringing the system to rest within the dead-zone.

For a cycle of reverse movement a substantially identical operation results with the roles of Q–1 and Q–2 being reversed.

The differential amplifier thus tracks the output from O.A.II responsive to voltages of positive or negative polarity and different levels associated with commands related to speed and sense of power applied to the system motor circuit. As shown in FIGURE 8, these leads are tied into separate halves of a switching circuit electromagnetically coupled to the system motor and power supply which in this embodiment is from an A.C. source through the primary t3p. Each half of the switching circuit is identical to include a transformer winding, such as t1p or t2p, which is adapted to develop trigger pulses to a respective half of a power supply switching circuit. The switching circuit works as follows: from a positive supply shown as 20 volts, current is supplied to the emitters of a pair of pnp transistors Q–3 and Q–5 through current limiting resistors r–29 and r–30. The bases of Q–3 and Q–5 are tied to this supply through resistor r–30 and in common to ground through resistor r–33. Q–3 and Q–5 are constant current sources to provide a linear charging current to C–4 and C–5. A capacitor C–6 is provided to filter variations in base voltage to the regulators Q–3 and Q–5. The positive 20 volt supply is also connected to the second base of unijunction transistors Q–4 and Q–6 through current limiting resistors r–28 and r–32, respectively. The other electrode of the second base of each of these transistors is tied to the primary employed to develop trigger pulses to the motor power supply, these being shown respectively as t1p and t2p. The emitter of each unijunction transistor is tied to the collector of the respective transistor Q–3 or Q–5 and to the lead from either Q–1 or Q–2 in the manner shown in FIGURE 8. Diodes D–12 and D–13 isolate the circuits of Q–4 and Q–6 from each other. With respect to each of the circuits of Q–4 and Q–6 there is provided a capacitor such as C–4 for Q–4 and C–5 for Q–6 connected to ground and connected across the collector lead from the associated transistor Q–3 or Q–5. Diodes D–14 and D–15 block C–4 and C–5 with respect to current flow from Q–4 and Q–5.

In operation, assuming that the system is in high speed operation by energization of lead F–1, a relatively high negative voltage is applied to the base of Q–1, which conducts at a relatively high level, Q–2 conducting at a low level. Accordingly, current flow through Q–3 is carried through Q–1 rather than serving to charge capacitor C–4 and the current flowing through Q–5 serves to charge C–5. This current is adjusted to charge C–5 rapidly to a point causing Q–6 to fire, producing a pulse through t1p.

Assuming that c.p.–1 is reached in the control cycle calling for medium speed (F–2 being energized and S–1 being closed), a temporary positive voltage will be applied to the base of Q–1 causing Q–1 to conduct at a very low level and Q–2 to conduct at a relatively high level. This will result in C–5 being charged very slowly and C–4 being charged quickly to cause Q–4 to fire and produce a pulse on the transformer leads t2p. Connected into this circuit at a point between D–12 and D–13 is a lead from a synchronizing voltage which effectively grounds this point of the circuit at the end of each half cycle of operation. The synchronizing voltage is developed from a winding now shown associated with the A.C. power supply impressed on primary t3p. The grounding of the point between D–14 and D–15 serves to synchronize the operation of the unijunction transistors Q–4 and Q–6 effectively cutitng them off at the end of each half cycle. The rate of charge of the respective capacitors C–4 and C–5 and the time of firing of Q–4 and Q–6 for each half cycle of the power supply is thus time related to the supply voltage. As will hereinafter be described, the occurrence of a triggering pulse from t1p or t2p at the beginning of a half cycle will cause substantially all of the power of the half cycle to be applied to the motor. A delay in the charging of C–4 or C–5 and in the firing of Q–4 or Q–6 will result in less power being applied to the motor.

The secondary windings for t1p and t2p are split and connected as shown in FIGURE 8 to the trigger electrodes of four switches which may be SCR's as shown. The pairs of switches Q–8, Q–9 and Q–10, Q–11, serve respectively, forward and reverse applications of power to the motor. Considering then an A.C. waveform is applied to t3p, a like signal will be developed in t3s, the first half wave being developed across the upper portion including Q–8 and Q–11 and the second half cycle being impressed across the lower portion including Q–9 and Q–10. Resistances r–34 and r–35 are provided to limit the current drawn during conduction of the switches for the forward sense of applied power and resistances r–36 and r–37 are similarly adjusted with respect to reverse power.

Assuming that the balance of the circuit calls for power applied in a forward sense as heretofore described, C–5 is caused to charge very quickly from Q–5 to fire Q–6 and produce a triggering pulse on t21 near the beginning of the half cycle of applied power. This pulse is impressed upon the related secondaries, t1s1 and t1s2, in a sense to fire both Q–8 and Q–9. The switch Q–9 will not fire because of the sense of applied voltage, but Q–8 does fire at the beginning of the half cycle and current flows through r–34, r–35, Q–8, the motor and return to the grounded center tap of t3s. On the next half cycle Q–6 as again caused to fire early in the cycle to produce a pulse causing Q–9 to fire; the sense of the half cycle being such as to cut Q–8 off. When Q–9 conducts it draws current through retsistors r–36 and r–37, Q–9, the motor and return to ground via the center tap of t3s. In this way full power is applied in the forward sense to the motor.

Reverse power or plugging is developed as follows: assuming that the control point c.p.–1 is reached, F–2 is energized and the tachometer voltage switched into the circuit to reverse conduction of Q–1 and Q–2, C–4 is caused to charge very quickly firing Q–4 developing a trigger pulse on t2p to in turn develop pulses on t2s1 and t2s2. The sense of the half cycle at that time permits Q–11 to be fired early in the half cycle and holds Q–10 off. This causes a current to be applied in a reverse sense to the motor through the circuit including the motor, Q–11, resistors r–34 and r–35 and the upper part of t3s to ground. The next half cycle causes Q–10 to be fired early in the half cycle to apply full power again in the reverse sense to the motor. When the motor and load have decelerated to a point where positive power is called for relative to medium speed, the voltage applied to the base of Q–1 is reversed in a sense such that Q–1 is caused to conduct at a substantial but reduced level and Q–2 is caused to conduct at a reduced level. This will cause C–4 to be charged at a reduced rate and will cause Q–6 to fire at a later time in the half cycle. This will result in the associated SCR's Q–8 and Q–9 firing at a later time in each half cycle and less positive power being applied to the motor. The same sort of operation occurs in low speed operation such that as the voltage applied to the differential amplifier is reduced, less and less power is applied to the motor to drive the motor and load at the reduced speed. A reverse cycle of system control will be substantially like that heretofore described, but of course, in a reverse sense.

Figure 2:
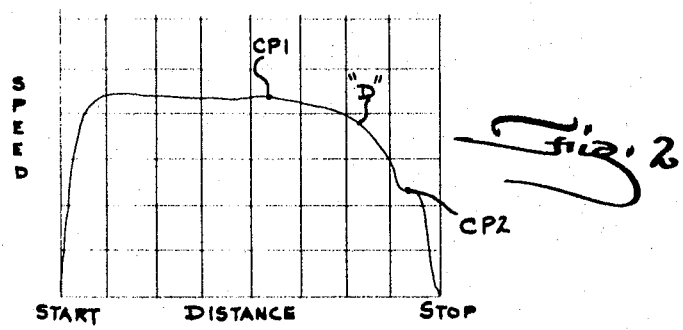

The circuit just previously described can be readily tuned in the manner described relative to FIGURE 3 and can be adjusted by the various adjustable resistors in the circuit to achieve an ideal operating characteristic like that shown in FIGURE 2, curve D.

The circuit of FIGURE 8 can be utilized to provide unidirectional control of a driven load, by removing the R leads and associated circuits. In this abbreviated form the circuit can be employed to supply a rotary driven part to supply wire feed in the manner heretofore described.

Relative to the circuit of FIGURE 8, the following components were employed:

Resistors:

| | |
|---|---|
| r–1 through r–6 and r–8 through r–11 | 10KΩ |
| r–13 | 50KΩ |
| r–14 | 10KΩ |
| r–15 | 1KΩ |
| r–16 and r–17 | 4.7KΩ |
| r–18 | 500Ω |
| r–19 | 33KΩ |
| r–20 | 1KΩ |
| r–21 | 4.7KΩ |
| r–22 | 22KΩ |
| r–23 | 50KΩ |
| r–24 | 10KΩ |
| r–25 | 100Ω |
| r–26 | 10KΩ |
| r–27 | 680Ω |
| r–28 and r–32 | 330Ω |
| r–29 | 4.7KΩ |
| r–30 | 6.8KΩ |
| r–33 | 15KΩ |
| r–34 and r–36 | 2Ω |
| r–35 and r–37 | ½Ω |

Capacitors:

| | | |
|---|---|---|
| C–1, C–2, C–3 | mfd | 0.006 |
| C–4, C–5 | mfd | 0.22 |

Inductors: L–1, L–2, L–3 _____ μh __ 560

Zener diode: Z–1 (10 volts) _____ 3020B

Diodes: D–5 through D–15 _____ IN3193

*Transistors:*
- Q-1, Q-2 _____ 2N2270—RCA
- Q-3 and Q-5 _____ 2N3638—Fairchild
- Q-6, Q-7 _____ 2N16718—GE

*SCR's:* Q-8 through Q-11 _____ 2N683—GE

Having now described and disclosed the preferred embodiments of our invention, we define it through the appended claims:

What is claimed is:

1. In a system for controlling movement of a driven part, a numerical control circuit operable to produce a numerical count output representative of the distance-to-go of said part for a cycle of movement, a motor to drive said part having a power supply and a tachometer producing a voltage instantaneously representative of the rate-of-travel of said part throughout a cycle of movement, a switching circuit connected to said power supply to provide drive current to said motor controlled in sense of application to effect forward or reverse driving power to said motor responsive to the polarity of a control signal and controlled in quantity to effect different rates-of-travel responsive to the voltage level of said control signal, a translator circuit connected to said numerical control circuit output and responsive thereto to produce distinct voltage levels each representative of a desired rate-of-travel over the distance-to-go of a cycle of movement, the said translator circuit being connected to said tachometer and to said switching circuit to provide said control signal as a composite of one of said voltage levels and said tachometer voltage whereby to effect a controlled acceleration and deceleration of the said part throughout the cycle of movement.

2. The system of claim 1 wherein said translator circuit is comprised of a plurality of paths interconnected into said numerical control circuit and means are provided to supply said paths with a fixed level of voltage input thereto, means associated with each of said paths to adjust the output voltage level from its said translator to develop the said distinct voltage levels.

3. The system of claim 1 wherein said translator circuit includes a voltage supply of a fixed level input thereto and separate paths having means therein to adjust such input voltage to provide a fixed output voltage level for each of said paths, each representative of a desired rate-of-travel of the driven part throughout the cycle of movement.

4. The system of claim 1 wherein said numerical control circuit includes a counter operable to produce a count representative of the distance-to-go of said driven part and said translator circuit includes a plurality of paths each associated with a different stage of said counter and operable to be energized sequentially as the count of said counter is reduced toward zero, each of the paths of said translator circuit including means to adjust a fixed voltage supply to provide a distinct voltage output level associated with a given rate-of-travel of said driven part.

5. The system of claim 1 wherein the said translator circuit includes a voltage supply of fixed voltage level, a plurality of paths through said translator connected to said voltage supply and operable to effect movement of the driven part in a reverse sense, each of said paths including means to adjust the said voltage supply to provide a distinct voltage level output representative of a distinct rate-of-travel of said part.

6. The system of claim 1 wherein there is an additionally included means operable to cut out said tachometer voltage during that time when said part is caused to move at a high rate-of-travel and operable responsive to the count in said numerical control circuit to cut in said tachometer voltage at a desired distance-to-go of said cycle of movement whereby to provide maximum rate-of-travel for said part when said distance-to-go is substantial and to provide a rapid reduction of the rate-of-travel of said part as said distance-to-go approaches zero.

7. The system of claim 1 wherein the said translator includes a plurality of paths associated with drive of said part in a forward sense and a plurality of paths associated with drive of said part in a reverse sense, a voltage supply of fixed level for said translator and means associated with each said path to sequentially produce a distinctive voltage level output each associated with a distinct rate-of-travel of the said part throughout the cycle of movement and there is included means to cut out the tachometer voltage responsive to numerical counts associated with the first fixed voltage level developed by said translator for both forward and reverse drive and to cut in said tachometer voltage responsive to numerical counts associated with the next to last fixed voltage level developed by said translator for both forward and reverse drive.

8. In a system for providing movement of a driven part over a given distance at a high rate of initial acceleration and terminal deceleration, a motor to drive said part, a power supply for said motor and a servocircuit including a tachometer developing a voltage proportional to motor movement connected to said part and said motor, control circuit means connected to control said servocircuit and operable to develop a numerical pulse count and distinct voltages representative of a distinct distance of travel of said part and further means responsive to said control circuit to develop a control signal when said count is greater than a given amount to initially interrupt said servocircuit connection and effect an application of approximately full power to said motor to develop maximum acceleration upon initiation of the cycle of movement of said part and then operable responsive to said control circuit to develop a further control signal when said count is less than said given amount to reconnect said servocircuit and restore control thereof over said motor under said control circuit count.

9. The system of claim 8 wherein said control circuit means includes means to provide said distinct voltage levels which are each representative of a desired rate-of-travel of said part with each level associated with a distinct distance-to-go in said cycle of movement, and the said levels are connected to said servocircuit tachometer voltage and to said power supply to form a composite signal effecting an application of power in forward and reverse senses to evenly and smoothly decelerate said motor and said driven part to zero rate-of-travel when said distance-to-go reaches approximately zero.

10. The system of claim 9 wherein the said control circuit means includes further means to change the polarity of said voltage levels to reverse the sense of said composite signal for a given distance-to-go and thereby reverse the sense of power applied to said motor and the direction of said driven part in its cycle of movement.

11. In a system for providing movement of a driven part over a given distance at a high rate of initial acceleration and a high rate of terminal deceleration, a motor to drive said part, a power supply for said motor and a servocircuit including a tachometer connected to said part and said motor, a control circuit operable to develop a numerical pulse count representative of a distinct distance of travel of said part and further means responsive to said control circuit and connected to said servocircuit to adjust the rate-of-travel of said part, said further means providing a plurality of fixed voltage levels responsive to fixed counts including at least a first level existing above a first count to cause said power supply to apply substantially full power to said motor to develop said initial acceleration, at least another level existing above a second count to cause said power supply to apply reverse power to said motor to initiate said terminal deceleration and a final level existing below said second count to cause said power supply to apply power to said motor to stop said part.

12. The system of claim 11 wherein said further means includes a plurality of distinct inputs of a common voltage level and a like plurality of distinct outputs of different voltage levels, at least three of which levels are associated with high, medium and low rate of travel of said driven part.

13. The system of claim 11 wherein the said further means includes a plurality of inputs from said control circuit of a common voltage level and polarity and is operable to provide a plurality of different voltage levels output therefrom, at least three of which are associated with high, medium and low rates-of-travel for said driven part in one direction and at least three of which are associated with high, medium and low rates-of-travel for said driven part in an opposite direction.

14. The system of claim 13 wherein said further means includes an operational amplifier having an approximate unity gain operable as a subtractor to produce an output of the distinctive voltage levels of said plurality of paths and of differing polarities with respect to the levels associated with forward and the levels associated with reverse drive of said driven part.

15. In a circuit utilized to convert a numerical count into an analog representation of said count, a plurality of signal paths each driven by a fixed voltage level derived from a different stage of a numerical counter, means in each of said paths to adjust said input voltage level to provide a reduced and different output voltage level associated with the operation of the stage connected to said path, said paths being divided into a first set connected in common to one separate input of an operational amplifier having a fixed voltage supply of one polarity and a second set connected in common to the other separate input of said operational amplifier having a further supply of fixed voltage level of opposite polarity, the said operational amplifier having a single output and unity gain whereby to provide distinct voltage levels each representative of a given count in said given counter which output is a positive polarity with respect to input from the one set of paths and of negative polarity with respect to input from the other set of paths whereby to provide a control signal representative of count quantity in terms of voltage level and representative of two distinct control functions in accordance with control signal polarity.

16. In a control circuit for regulating the rate-of-travel of a driven part, a control signal source, a switching circuit responsive thereto to supply power to a motor driving the part in forward or reverse senses dependent upon control signal polarity and in rate-of-travel dependent upon control signal voltage level, said control signal source including a tachometer driven by said motor to develop a voltage related to motor rate-of-travel, counter means operable to produce a series of pulses for distinct periods of time together defining a cycle of movement for said motor, translator means responsive to said pulses to produce a distinct and fixed voltage level associated with each period of time, the first fixed voltage level being connected to said switching circuit to apply substantially full power to develop maximum acceleration of said motor, the second fixed level being connected to said switching circuit to apply reduced power to said motor and the third fixed level being connected to said switching circuit to apply a further reduced power to said motor, the said second and third fixed voltage levels being adjusted relative to said tachometer voltage to cause said control signal to temporarily reverse polarity at the beginning of each of the periods of the second and third fixed levels to decelerate the motor.

17. In a control circuit for controlling the movement of a part by regulating the sense and quantity of power supplied to a motor driving said part, first means programmable to produce a cycle of pulses numerically representing distance of part movement, second means responsive to said first means to provide a control signal including an input of fixed voltage levels of amplitudes in distinct steps each related to a rate-of-travel of said part and a polarity related to the sense of power applied to the motor to effect acceleration and deceleration, a differential amplifier driven by said control signal to produce separate signals each of an amplitude related to the control signal and of different polarity, a switching circuit driven by said signals to provide separate outputs in accordance with signal polarity and related in duration to the amplitude of the said separate signals, one of the outputs operating to effect motor drive in one sense, the other of the outputs operating to effect motor drive in an opposite sense and a power supply including means responsive to said outputs to vary the quantity of power applied to said motor dependent upon the duration of said outputs and to vary the sense of power applied to said motor dependent upon selection of output.

18. In a method of controlling the movement of a part driven by a motor for a given distance through a numerically controlled computer system effecting a count proportional to distance-to-go, the steps comprising first applying approximately full power to drive said motor to accelerate said part to approximately maximum speed independent of numerical count, maintaining power applied to said motor to drive said part at approximately maximum speed over a substantial portion of said distance independent of numerical count, and then reversing the power to said motor to decelerate said part to a medium speed based on a fixed first count, followed by a second step comprised of applying power to drive said motor to maintain said part at medium speed over most of the remainder of said distance based upon said fixed first count and then applying power to drive said motor in a reverse sense to decelerate said part to a low speed based upon a fixed second count, followed by a third step comprised of maintaining power applied to said motor to drive said part at said low speed for the remainder of said distance based upon said fixed second count and then applying power to drive said motor in a reverse sense to decelerate said part to zero speed at the end of said distance based upon the instantaneous numerical count, the said application of power to drive said part in said medium and low speeds and the power applied to decelerate said part being adjusted to provide a stepped speed-distance characteristic of deceleration from maximum speed to zero speed which approximates the speed-distance characteristic which would result from a continuous deceleration from said maximum speed to zero speed.

19. In a method of controlling the movement of a part driven by a motor for a given distance the steps comprising providing a control circuit including fixed voltage levels utilized to effect the driving of said part over most of said distance at a given speed and over most of the remainder of said distance at a lesser speed which is limited to prevent over-shoot of said part, sensing the arrival of said part at a first control point representative of an instantaneous part position near the end of part travel and sensing the arrival of said part at a second control point representative of an instantaneous part position at the end of part travel, dynamically braking said motor to decelerate said part from said given speed at said first control point to the lesser speed and dynamically braking said motor to stop said part at the end of part travel, and then adjusting said fixed voltage levels to adjust the said given and/or lesser speeds relative to the extent of dynamic braking to provide a deceleration of said part to said lesser speed from said given speed which begins effectively after said part has passed said first control point in its movement toward the end of part travel whereby to provide a reduced time of travel of said part.

20. In a method of controlling the movement of a pair driven by a motor at given speeds, the steps comprising providing in a control count fixed reference voltage levels to control part drive, driving said part at distinct progressively reduced speeds for progressively reduced portions of said distance with the last distinct speed being limited to prevent over-shoot, sensing the arrival of said part at distinct distances from the end of travel associated with changes from one speed to another and dynamically braking the driving motor to decelerate said part at or near the beginning of each distinct distance and adjusting said reference voltages to adjust the speeds and rates of deceleration relative to each other and to the inertia of said part and the moving portions of said motor so that the part is at a distance from the end of travel at the end of each period of deceleration which distance is only slightly greater from the end of part travel than the next distinct distance from the end of travel in the cycle of control.

References Cited
UNITED STATES PATENTS

| | | | |
|---|---|---|---|
| 2,727,194 | 12/1955 | Seid. | |
| 2,906,934 | 9/1959 | Bower et al. | |
| 3,110,865 | 11/1963 | Scuitto. | |
| 3,139,570 | 6/1964 | Jacobson et al. | |
| 3,293,522 | 12/1966 | Lewis | 318—257 XR |
| 3,376,486 | 4/1968 | Caputo | 318—257 |

B. DOBECK, Primary Examiner

U.S. Cl. X.R.

318—24, 28